(12) United States Patent
Dai et al.

(10) Patent No.: US 10,297,821 B2
(45) Date of Patent: May 21, 2019

(54) CATHODE-ACTIVE MATERIALS, THEIR PRECURSORS, AND METHODS OF FORMING

(71) Applicant: Apple Inc., Cupertino, CA (US)

(72) Inventors: Hongli Dai, Los Altos, CA (US); Christopher Johnson, Naperville, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,825

(22) Filed: Sep. 23, 2016

(65) Prior Publication Data

US 2017/0092949 A1 Mar. 30, 2017

Related U.S. Application Data

(60) Provisional application No. 62/235,049, filed on Sep. 30, 2015.

(51) Int. Cl.
*H01M 4/505* (2010.01)
*C01G 45/00* (2006.01)
(Continued)

(52) U.S. Cl.
CPC ............ *H01M 4/505* (2013.01); *C01G 45/02* (2013.01); *C01G 51/04* (2013.01); *C01G 51/44* (2013.01);
(Continued)

(58) Field of Classification Search
CPC .......... H01M 4/505; H01M 2004/028; H01M 4/525; C01G 45/04; C01G 51/04;
(Continued)

(56) References Cited

U.S. PATENT DOCUMENTS 5,744,262 A 4/1998 Cheng et al.
6,007,947 A 12/1999 Mayer
(Continued)

FOREIGN PATENT DOCUMENTS

CN 1588675 3/2005
CN 1702891 11/2005
(Continued)

OTHER PUBLICATIONS

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.
(Continued)

*Primary Examiner* — Harold Y Pyon
*Assistant Examiner* — Danny N Kang
(74) *Attorney, Agent, or Firm* — Polsinelli PC

(57) ABSTRACT

Methods are presented for synthesizing a metal precursor for a cathode-active material. The methods include adding urea to a solution comprising dissolved ions of at least one transition metal selected from Mn, Co, and Ni. The methods also include increasing a pH of the aqueous solution to a threshold pH. The methods additionally include heating the aqueous solution to precipitate a compound that includes the at least one transition metal. Such heating may involve urea decomposition. Methods are also presented that include filtering the compound from the solution and contacting the compound with at least a lithium precursor to produce a reactant charge. In these methods, the reactant charge is calcined to produce the cathode-active material. Other methods are presented.

20 Claims, 7 Drawing Sheets

(51) Int. Cl.
*H01M 4/525* (2010.01)
*C01G 45/02* (2006.01)
*C01G 51/04* (2006.01)
*C01G 51/00* (2006.01)
*C01G 53/04* (2006.01)
*C01G 53/00* (2006.01)
*H01M 4/02* (2006.01)

(52) U.S. Cl.
CPC .............. *C01G 53/04* (2013.01); *C01G 53/44* (2013.01); *H01M 4/525* (2013.01); *C01P 2004/03* (2013.01); *H01M 2004/028* (2013.01)

(58) Field of Classification Search
CPC ........ C01G 51/44; C01G 53/04; C01G 53/44; C01P 2004/03
USPC .......................................................... 252/500
See application file for complete search history.

(56) References Cited

U.S. PATENT DOCUMENTS

| | | | |
|---|---|---|---|
| 6,077,496 A | 6/2000 | Hiraoka et al. | |
| 6,677,082 B2 | 1/2004 | Thackeray et al. | |
| 6,680,143 B2 | 1/2004 | Thackeray et al. | |
| 7,135,252 B2 | 11/2006 | Thackeray et al. | |
| 7,205,072 B2 | 4/2007 | Kang et al. | |
| 7,238,450 B2 | 6/2007 | Howard, Jr. et al. | |
| 7,314,682 B2 | 1/2008 | Thackeray et al. | |
| 7,314,684 B2 | 1/2008 | Kang et al. | |
| 7,435,402 B2 | 10/2008 | Kang et al. | |
| 7,468,223 B2 | 12/2008 | Thackeray et al. | |
| 7,655,361 B2 | 2/2010 | Kim et al. | |
| 7,732,096 B2 | 6/2010 | Thackeray et al. | |
| 7,754,384 B2 | 7/2010 | Patoux et al. | |
| 7,897,674 B2 | 3/2011 | Zaghib | |
| 7,923,149 B2 | 4/2011 | Hwang et al. | |
| 8,148,011 B2 | 1/2012 | Thackeray et al. | |
| 8,187,746 B2 | 5/2012 | Chen et al. | |
| 8,206,852 B2 | 6/2012 | Chang et al. | |
| 8,277,683 B2 | 10/2012 | Deng et al. | |
| 8,337,727 B2 | 12/2012 | Chen et al. | |
| 8,383,077 B2 | 2/2013 | Thackeray et al. | |
| 8,801,960 B2 | 8/2014 | Ueda et al. | |
| 10,084,187 B2 | 9/2018 | Dai et al. | |
| 10,128,494 B2 | 11/2018 | Dai et al. | |
| 10,141,572 B2 | 11/2018 | Wu et al. | |
| 10,164,256 B2 | 12/2018 | Wu et al. | |
| 2002/0061444 A1 | 5/2002 | Kweon et al. | |
| 2002/0114995 A1 | 8/2002 | Thackeray | |
| 2002/0136954 A1 | 9/2002 | Thackeray | |
| 2002/0182504 A1 | 12/2002 | Imachi et al. | |
| 2003/0039886 A1 | 2/2003 | Zhang et al. | |
| 2003/0073002 A1 | 4/2003 | Imachi et al. | |
| 2003/0082445 A1 | 5/2003 | Smieth et al. | |
| 2004/0029008 A1 | 2/2004 | Winterberg | |
| 2004/0191633 A1 | 9/2004 | Johnson et al. | |
| 2004/0258836 A1 | 12/2004 | Besenhard et al. | |
| 2005/0026040 A1 | 3/2005 | Thackery | |
| 2005/0074675 A1 | 4/2005 | Nishijima et al. | |
| 2005/0130042 A1 | 6/2005 | Liu et al. | |
| 2005/0136329 A1 | 6/2005 | Howard, Jr. et al. | |
| 2005/0265909 A1 | 12/2005 | Kajiya et al. | |
| 2005/0271948 A1 | 12/2005 | Kang | |
| 2006/0024584 A1 | 2/2006 | Kim et al. | |
| 2006/0068293 A1 | 3/2006 | Kim et al. | |
| 2006/0081818 A1 | 4/2006 | Ito et al. | |
| 2006/0088767 A1 | 4/2006 | Li et al. | |
| 2006/0099508 A1 | 5/2006 | Thackeray et al. | |
| 2006/0159994 A1 | 7/2006 | Dahn et al. | |
| 2006/0194118 A1 | 8/2006 | Yew et al. | |
| 2006/0204851 A1* | 9/2006 | Lee .................... H01M 4/0471 429/231.3 | |
| 2006/0177739 A1 | 10/2006 | Endo et al. | |
| 2006/0240326 A1 | 10/2006 | Lee | |
| 2007/0172739 A1 | 7/2007 | Visco | |
| 2007/0202407 A1 | 8/2007 | Eberman et al. | |
| 2008/0057401 A1 | 3/2008 | Mori et al. | |
| 2008/0090150 A1 | 4/2008 | Nakura | |
| 2008/0118847 A1 | 5/2008 | Jung et al. | |
| 2008/0131778 A1 | 6/2008 | Watanabe et al. | |
| 2008/0160415 A1 | 7/2008 | Wakita et al. | |
| 2008/0280205 A1 | 11/2008 | Jiang et al. | |
| 2008/0311473 A1 | 12/2008 | Sasaoka et al. | |
| 2008/0318131 A1 | 12/2008 | Watanabe et al. | |
| 2009/0092903 A1 | 4/2009 | Johnson et al. | |
| 2009/0146115 A1 | 6/2009 | Xiao et al. | |
| 2009/0200510 A1 | 8/2009 | Watanabe et al. | |
| 2009/0202905 A1 | 8/2009 | Morita et al. | |
| 2009/0239148 A1 | 9/2009 | Jiang | |
| 2010/0055567 A1 | 4/2010 | Nakai et al. | |
| 2010/0086853 A1 | 4/2010 | Venkatachalam et al. | |
| 2010/0086854 A1 | 4/2010 | Kumar et al. | |
| 2010/0151332 A1 | 6/2010 | Lopez et al. | |
| 2010/0173197 A1 | 7/2010 | Li et al. | |
| 2010/0304225 A1 | 12/2010 | Pascaly et al. | |
| 2011/0014518 A1 | 1/2011 | Nakai et al. | |
| 2011/0017529 A1 | 1/2011 | Kumar et al. | |
| 2011/0031437 A1 | 2/2011 | Nagase et al. | |
| 2011/0052981 A1 | 3/2011 | Lopez et al. | |
| 2011/0053001 A1 | 3/2011 | Babic et al. | |
| 2011/0076556 A1 | 3/2011 | Karthikeyan et al. | |
| 2011/0076564 A1 | 3/2011 | Yu et al. | |
| 2011/0111294 A1 | 5/2011 | Lopez et al. | |
| 2011/0111298 A1 | 5/2011 | Lopez et al. | |
| 2011/0121240 A1 | 5/2011 | Amine et al. | |
| 2011/0136019 A1 | 6/2011 | Amiruddin et al. | |
| 2011/0143174 A1 | 6/2011 | Kim | |
| 2011/0165474 A1 | 7/2011 | Im et al. | |
| 2011/0171371 A1 | 7/2011 | Li et al. | |
| 2011/0171539 A1 | 7/2011 | Patoux et al. | |
| 2011/0200864 A1 | 8/2011 | Dai | |
| 2011/0200880 A1 | 8/2011 | Yu | |
| 2011/0223492 A1 | 9/2011 | Sakitani et al. | |
| 2011/0244331 A1 | 10/2011 | Karthikeyan et al. | |
| 2011/0294006 A1 | 12/2011 | Amine et al. | |
| 2011/0294019 A1 | 12/2011 | Amine et al. | |
| 2012/0040247 A1 | 2/2012 | Manivannan et al. | |
| 2012/0168696 A1 | 5/2012 | Huang et al. | |
| 2012/0196176 A1 | 8/2012 | He et al. | |
| 2012/0282522 A1 | 11/2012 | Axelbaum et al. | |
| 2012/0295155 A1 | 11/2012 | Deng et al. | |
| 2013/0004826 A1 | 1/2013 | Li et al. | |
| 2013/0011738 A1 | 1/2013 | Zhou | |
| 2013/0101893 A1 | 4/2013 | Dai et al. | |
| 2013/0149604 A1 | 6/2013 | Fujiki et al. | |
| 2013/0252107 A1 | 9/2013 | Lee et al. | |
| 2014/0087065 A1 | 3/2014 | Li et al. | |
| 2014/0087254 A1 | 3/2014 | Li et al. | |
| 2014/0087256 A1 | 3/2014 | Li et al. | |
| 2014/0087261 A1 | 3/2014 | Li et al. | |
| 2014/0141331 A1 | 5/2014 | Lee et al. | |
| 2014/0158932 A1 | 6/2014 | Sun et al. | |
| 2014/0175329 A1 | 6/2014 | Palma et al. | |
| 2014/0234715 A1 | 8/2014 | Fasching et al. | |
| 2014/0272563 A1 | 9/2014 | Dai et al. | |
| 2015/0140421 A1 | 5/2015 | Ihara et al. | |
| 2015/0171423 A1 | 6/2015 | Kim et al. | |
| 2015/0243971 A1 | 8/2015 | Cho et al. | |
| 2015/0243984 A1 | 8/2015 | Kase et al. | |
| 2015/0311522 A1 | 10/2015 | Fang et al. | |
| 2016/0036043 A1 | 2/2016 | Dai et al. | |
| 2016/0156032 A1 | 6/2016 | Lee et al. | |
| 2016/0315315 A1 | 10/2016 | Olken et al. | |
| 2017/0133678 A1 | 5/2017 | Ozoemena et al. | |
| 2017/0214045 A1 | 7/2017 | Dai et al. | |
| 2017/0263917 A1 | 9/2017 | Dai et al. | |
| 2017/0263928 A1 | 9/2017 | Dai et al. | |
| 2017/0263929 A1 | 9/2017 | Wu et al. | |
| 2017/0346082 A1 | 11/2017 | Dai et al. | |
| 2018/0062156 A1 | 3/2018 | Wu et al. | |
| 2018/0079655 A1 | 3/2018 | Dai et al. | |
| 2018/0083277 A1 | 3/2018 | Dai et al. | |
| 2018/0083278 A1 | 3/2018 | Dai et al. | |

(56) References Cited

U.S. PATENT DOCUMENTS

| | | |
|---|---|---|
| 2018/0215629 A1 | 8/2018 | Honma et al. |
| 2018/0294522 A1 | 10/2018 | Dai et al. |
| 2018/0351173 A1 | 12/2018 | Dai et al. |

FOREIGN PATENT DOCUMENTS

| | | | |
|---|---|---|---|
| CN | 1770514 | | 10/2006 |
| CN | 101150190 | | 3/2008 |
| CN | 101223660 | | 7/2008 |
| CN | 101284681 | | 10/2008 |
| CN | 101694877 | | 4/2010 |
| CN | 101734728 | | 6/2010 |
| CN | 102110808 | | 6/2011 |
| CN | 102299299 | | 12/2011 |
| CN | 102332585 | | 1/2012 |
| CN | 102368548 | | 3/2012 |
| CN | 102386381 | A * | 3/2012 |
| CN | 102479947 | | 5/2012 |
| CN | 102484249 | | 5/2012 |
| CN | 102544575 | | 7/2012 |
| CN | 102646831 | | 8/2012 |
| CN | 102683666 | | 9/2012 |
| CN | 102723459 | | 10/2012 |
| CN | 102751481 | | 10/2012 |
| CN | 102881891 | | 1/2013 |
| CN | 103296249 | | 9/2013 |
| CN | 102386381 | | 1/2014 |
| CN | 103872302 | | 6/2014 |
| CN | 103872315 | | 6/2014 |
| CN | 103972493 | A * | 8/2014 |
| DE | 10352063 | | 6/2005 |
| JP | 4-267053 | | 9/1992 |
| JP | H-10-087327 | | 4/1998 |
| JP | 2005-101003 | | 4/2005 |
| JP | 2005-289700 | | 10/2005 |
| JP | 2009-4311 | | 1/2009 |
| JP | 2015-213038 | | 11/2015 |
| KR | 10-2002-0063501 | | 8/2002 |
| KR | 10-2014-0073856 | | 6/2014 |
| KR | 101731473 | | 4/2017 |
| TW | 201126798 | | 8/2011 |
| TW | 201342695 | | 10/2013 |
| WO | WO 2004/045015 | | 5/2004 |
| WO | WO 2004/107480 | | 12/2004 |
| WO | WO 2008/069351 | | 6/2008 |
| WO | WO 2009/120515 | | 10/2009 |
| WO | WO 2010/011569 | | 1/2010 |
| WO | WO 2010/139404 | | 12/2010 |
| WO | WO 2011/020073 | | 2/2011 |
| WO | WO 2011/054441 | | 5/2011 |
| WO | WO 2013/048048 | | 4/2013 |
| WO | WO 2014/014913 | | 1/2014 |
| WO | WO 2014/119165 | | 8/2014 |

OTHER PUBLICATIONS

Li, "Layered Oxides Li1+xM1-xO2 (M=Ni, Mn, Co, Al) as Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn—Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of The Electrochemical Society*, vol. 148, No. 10, pp. A1110-A1115.

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.

Arunkumar et al., "Chemical and structural instability of the chemically delithiated (1-z) Li[Li$_{1/3}$Mn$_{2/3}$]O$_2$ (z) Li[Co$_{1-y}$Ni$_y$]O$_2$ (O ≤ y ≤ 1 and 0 ≤ z ≤ 1) solid solution cathodes," *Journal of Materials Chemistry*, vol. 18, pp. 190-198.

Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.

Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.

Patoux et al., "Layered Manganese Oxide Intergrowth Electrodes for Rechargeable Lithium Batteries. 2. Substitution with Al," *Chem. Mater.*, 2005, vol. 17, pp. 1044-1054.

Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.

Wang et al., "Synthesis of Li$_2$MnO$_3$-stabilized LiCoO$_2$ cathode material by spray-drying method and its high voltage performance," *Journal of Alloys and Compounds*, 2015, vol. 626, pp. 228-233.

Lee et al., "Characteristics of LiCoO$_2$ and Its Precursor Synthesized by a Uniform Precipitation Method," *Electrochemical and Solid-State Letters*, 2010, vol. 13, No. 7, pp. A81-A84.

Zhao et al., "Progress of Research on the Li-rich Cathode Materials xLi2MnO3(1-x)LiMO2(M+Co, Fe, Ni1/2Mn1/2 . . . ) for Li-ion Batteries," *Journal of Inorganic Materials*, vol. 26(7), pp. 673-679, Jul. 2011.

Kobayashi et al., "Study on the Crystal and Electronic Structures of the Layered Li2Mo3—LiMo2 Materials in Li De-Intercalation Process," *Photon Factory Activity Report*, 2012, vol. 29, No. 2011, 1 pp.

Giordano et al., "Metal Nitride and Metal Carbide Nanoparticles by a Soft Urea Pathway," *Chem. Mater.*, 2009, vol. 21, pp. 5136-5144.

Koyama et al., "First principles study of dopant solubility and defect chemistry in Li CoO2," *J. Mater. Chem A.*, 2014, vol. 2, pp. 11235-11245.

Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.

Zeng et al, "Investigation of the Structural Changes in Li[NiyMnyCo(1-2y]O-2 (y=0.05) upon Electrochemical Lithium Deintercalation," *Chemistry of Materials*, 2010, vol. 22, No. 3, pp. 1209-1219.

Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.

Bentaleb et al., "On the LiNi0.2Mn0.2Co0.6O2 positive electrode material," *Journal of Power Sources*, 2010, vol. 195, No. 5, pp. 1510-1515.

Ben Kamel et al, "Local Structure and electrochemistry of LiNiyMnyCo1-2y)O2 electrode materials for Li-ion batteries," *Ionics*, 2008, vol. 14, No. 2, pp. 89-97.

Stoyanova et al., "High-Frequency Electron Paramagnetic Resonance Analysis of the Oxidation State and Local Structure of Ni and Mn Ions in Ni,Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.

Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.

Seong-Min Bak et al, "Structural Changes and Thermal Stability of Charged LiNixMnyCozO2 Cathode Materials Studied by Combined In Situ Time-Resolved Xrd and Mass Spectroscopy," *ACS Appl. Mater. Interfaces*, 2014, vol. 6, pp. 22594-22601.

Nam et al. "Ammonia-free coprecipitation synthesis of a Ni—Co—Mn hydroxide precursor for high-performance battery cathode materials," *Green Chemistry*, 2015. vol. 17, pp. 1127.

(56) References Cited

OTHER PUBLICATIONS

Xie et al., "An improved continuous co-precipitation method to synthesize LiNi0.80Co0.15Al0.05O2 cathode material," *Journal of Alloys and Compounds*, 2016, vol. 666, pp. 84-87.
Wu et al., "Effect of Al3+ and F-Doping on the Irreversible Oxygen Loss from Layered Li[Li0.17Mn0.58Ni0.25]O2 Cathodes," *Electrochemical and Solid-State Letters*, 2007, vol. 10, No. 6, pp. A151-A154.
Li et al, "Effects of fluorine doping on structure, surface chemistry, and electrochemical performance of LiNi0.8Co0.15Al0.05O2," *Electrochimica Acta*, 2015, vol. 174, pp. 1122-1130.
Cho et al., "Exploring Lithium Deficiency in Layered Oxide Cathod for Li-Ion Battery," *Advanced Sustainable Systems*, 2017, 1700026, 10 pages.
Lee et al., "Surface modification of LiNi0.5Mn1.5O4 cathodes with ZnAl2O4 by a sol-gel method for lithium ion batteries," *Electrochimica Acta*, 2014, vol. 115, pp. 326-331.
Kim et al., "Effect of fluorine on Li[Ni1/3Co1/3Mn1/3]O2-zFz as lithium intercalation material," *Journal of Power Sources*, 2005, vol. 146, pp. 602-605.
Yue et al., "The enhanced electrochemical performance of LiNi0.6Co0.2Mn0.2O2 cathode materials by low temperature fluorine substitution," *Electrochimica Acta*, 2013, vol. 95, pp. 112-118.
Wang et al., "Effect of surface fluorine substitution on high voltage electrochemical performances of layered LiNi0.5Co0.2Mn0.3O2 cathode materials," *Applied Surface Science*, 2016, vol. 371, pp. 172-179.
Tang et al., "Synthesis and characterization of LiFePO4 coating with aluminum doped zinc oxide," *Trans. Nonferrous Met. Soc. China*, 2013, vol. 23, pp. 451-455.
Myung et al., "Functionality of Oxide Coating for Li[Li0.05Ni0.4Co0.15Mn0.4])2 as Positive Electrode Materials for Lithium-Ion Secondary Batteries," *J. Phys. Chem. C*, 2007, vol. 111, pp. 4061-4067.
Liu et al., "Investigation the electrochemical performance of Li1.2Ni0.2Mn0.6O2 cathode material with ZnAl2O4 coating for lithium ion batteries," *Journal of Alloys and Compounds*, 2016, vol. 685, pp. 523-532.
Kim et al., "Improvement of High-Voltage Cycling Behavior of Surface-Modified Li[Ni1/3Co1/3Mn1/3]O2 Cathodes by Fluorine Substitution for Li-Ion Batteries," *J. Electrochem. Soc.*, 2005, vol. 152, Issue 9, pp. A1707-A1713.
Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.
Reddy et al., "Effects of LLTO coating on high temperature cycle life performance of LiMn2O4 cathode material," Abstract #382, 2012, The Electrochemical Society, 2 pages.
Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.
Lee et al., "The Effects of Li—La—Ti—O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.
Lee et al., "The Effect of Coating Thickness on the Electrochemical Properties of a Li—La—Ti—O-coated Li[Ni0.3Co0.4Mn0.3]O2 Cathode," *Bull. Korean Chem. Soc.*, 2010, vol. 31, No. 11, pp. 3233-3237.
Hu et al., "Enhanced electrochemical performance of LiMn2O4 cathode with a Li0.34La0.51TiO3-caoted layer," *RSC Advances*, 2015. vol. 5, pp. 17592-17600.
Fergus et al., "Recent Developments in Cathode Materials for Lithium Ion Batteries," *Journal of Power Sources*, Vo. 195, No. 4, 23010, pp. 939-954.
Gille G. et al., "Cathode Materials for Rechargeable Batteries-Preparation, Structure-Property Relationships and Performance," *Solid State Ionics*, Vo. 148, No. 3-4, 2002, pp. 269-282.

Periasamy et al., "High Voltage and High Capacity Characteristics of LiNi1/3Co1/3Mn1/3O2 Cathodes for Lithium Battery Applications," *Int. J. Electrochecm Soc.*, vol. 2, 2007, pp. 689-699.
Manthiram Lab Highlights, "Passivation of Spinel Cathode Surface through Self-Segregarion of Iron," May 7, 2010.
Cerion Power, "Our Power Business," www.cerionenterprises.com/companies_and_applications/power, accessed Sep. 8, 2011.
ETV Motors, "High5ive advanced high-voltage cells," www.etvemotors.com/advanced-battery.htm, accessed Sep. 8, 2011.
Wolfenstine et al., US Army RDECOM, "High Cycle Life Cathode for High Voltage (5V) Lithium Ion Batteries."
Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.
Xu, US Army RDECOM, "Electrolyte for Next Generation 5V Li-Ion Batteries."
Ghosh et al., "Block Copolymer Solid Battery Electrolyte with High Li-Ion Transference Number," *Journal of the Electrochemical Society*, 2010, vol. 157, No. 7, pp. A846-A849.
Abu-Lebdeh et al., High-Voltage Electrolytes Based on Adiponitrile for Li-Ion Batteries, *Journal of the Electrochemical Society*, 2009, vol. 156, No. 1, pp. A60-A65.
Jow et al., "High Voltage Electrolytes for Li-ion Batteries," U.S. Research Laboratory, Presentation, May 2011.
Lucht, University of Rhode Island, "Development of Electrolytes for Lithium-ion Batteries," Presentation, May 11, 2001.
Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.
David Howell, US Department of Energy, "Vehicle Technologies Program," 2011 Annual Merit Review and Peer Evaluation Meeting, Presentation, May 9-13, 2011.
Fey et al., Preparation and electrochemical properties of high-voltage cathode maters, LiMyNi0.5-yMn1.5O4 (M=Fe, Cu, Al, Mg; y=0.0-0.4), *Journal of Power Sources*, 2003, vol. 115, pp. 332-345.
Kawai et al., "High-voltage lithium cathode materials," Journal of Power Sources, 1999, vols. 81-82, abstract only.
Huang et al., "Lithium cobalt phosphate: a high voltage lithium ion cathode material," Valence Technologies.
"Award Details," SBIR/STTR, www.sbir.gov/sbirsearch/detail/233700, accessed Sep. 8, 2011.
Ju et al., "LiCo1-xAlxO2 (0≤x≤0.05) cathode powders prepared from the nanosized Co1-xAlxOy precursor powders," *Materials Chemistry and Physics*, 112 (2008), pp. 536-541.
Rouse et al., "Electrochemical Studies of Single Crystals of Lithiated Nickel Oxide," *Journal of The Electrochemical Society*, Feb. 1996, vol. 13, No. 2, pp. 184-190.
Jin et al., "Observation of Bulk Superconductivity in $Na_xCoO_2 \cdot yH_2O$ and $Na_xCoO_2 \cdot yD_2O$ Powder and Single Crystals," *Phys Rev Lett*, 2008, vol. 91, Issue 21, id. 217001, 4 pages.
Franger et al., "Chemistry and Electrochemistry of Low-Temperature Manganese Oxides as Lithium Intercalation Compounds," *Journal of The Electrochemical Society*, 2000, vol. 147, No. 9, pp. 3226-3230.
Lu et al., "Layered $Li[Ni_xCo_{1-2x}Mn_x]O_2$ Cathode Materials for Lithium-Ion Batteries," *Electrochemical and Solid-State Letters*, 2001, vol. 4, No. 12, pp. A200-A203.
Shinova et al., "Cationic distribution and electrochemical performance of $LiCo_{1/3}Ni_{1/3}Mn_{1/3}O_2$ electrodes for lithium-ion batteries," 2008, *Solid State Ionics*, vol. 179, pp. 2198-2208.
Choi et al., "$^{27}$Al NMR Chemical Shifts in Oxide Crystals: A First-Principles Study," *J. Phys. Chem. C*, 2009, 113 (9), pp. 3869-3873.
Lee et al., "Solid-state NMR Studies of Al-doped and Al2O3-coated LiCoO2," *Electrochimica Acta*, Nov. 30, 2004, vol. 50, Issues 2-3, pp. 491-494.

\* cited by examiner

CATHODE-ACTIVE MATERIALS, THEIR PRECURSORS, AND METHODS OF FORMING

CROSS-REFERENCE TO RELATED APPLICATION(S)

The present application claims the benefit under 35 U.S.C. § 119(e) of U.S. Provisional Patent Application No. 62/235,049, entitled "CATHODE-ACTIVE MATERIALS, THEIR PRECURSORS, AND METHODS OF FORMING," filed on Sep. 30, 2015, which is incorporated herein by reference in its entirety.

This invention was made with U.S. government support under WFO Proposal No. 85F59. The government has certain rights in the invention.

FIELD

This disclosure relates generally to battery materials, and more particularly, to cathode-active materials, their precursors and methods of forming.

BACKGROUND

Batteries employ cathode-active materials to release and store cations during charge and discharge operations, respectively. Such cathode-active materials include transition metal oxides, which are commonly used in lithium-ion batteries to exchange lithium cations with an electrolyte. Transition metal oxides can include Mn, Ni, or Co, which have received particular attention due to their improved performance as cathode-active materials. This improved performance can result in higher energy densities, increased operating voltages, longer cycling lifetimes, and faster charge/discharge rates for the batteries involved. Other benefits are possible.

The performance of transition metal oxides can be influenced by a manner in which they are formed. Conventional methods of forming transition metal oxides involve solutions of transition metal salts, which are raised in pH to precipitate a transition metal precursor. Base additives, such as ammonium hydroxide, are used to effectuate this raise. However, these base additives typically offer little control over nucleation and growth processes in solution. Thus, particles precipitated using conventional methods may exhibit undesirable characteristics, including low densities, poorly-defined morphologies, broad particle size distributions, and deficient chemical stoichiometries. Such characteristics can limit an effectiveness of the transition metal precursor in producing a transition metal oxide that has improved performance (i.e., as a cathode-active material).

SUMMARY

In various aspects, the disclosure relates to cathode-active materials, their precursors, and methods of forming the same. More specifically, methods are presented that utilize urea to prepare a metal precursor, which in turn, is then processed into a cathode-active material. Urea is added into a solution whose pH is subsequently raised to a threshold pH. Heat is applied to the solution, which may include decomposing urea therein into carbon dioxide and ammonia. The threshold pH and urea decomposition function in combination to control a nucleation and growth of seeds into precipitate particles. Such control enables improvements in characteristics of the precipitate particles including density, particle size, particle size distribution, morphology, composition, and chemical homogeneity. Other characteristics and their improvements are possible.

In some embodiments, the methods involve synthesizing a metal precursor for a cathode-active material. In such embodiments, the methods include adding urea to a solution comprising dissolved ions of at least one transition metal selected from the Mn, Co, and Ni. The methods also include increasing a pH of the solution to a threshold pH. The pH may be increased using a basic additive. The methods additionally include heating the solution to precipitate a compound comprising the transition metal(s). Heating the solution may include heating the solution to cause urea decomposition.

In other embodiments, the methods involve producing a cathode-active material using a metal precursor. In these embodiments, the methods include adding urea to a solution comprising dissolved ions of at least one transition metal selected from the Mn, Co, and Ni. The methods also include increasing a pH of the solution to a threshold pH. The pH may be increased using a basic additive. The methods additionally include heating the solution to cause urea decomposition and precipitating a compound comprising the transition metal(s). Moreover, the methods include filtering the compound from the solution. The methods involve contacting the compound with at least a lithium precursor to produce a reactant charge. The methods also involve calcining the reactant charge to produce the cathode-active material.

In yet other embodiments, the methods involve synthesizing a metal precursor for a cathode-active material comprising Mn and Co. The methods include adding urea to a solution comprising dissolved ions of Mn and Co. The methods also include the step of increasing a pH of the solution to a threshold pH between 7.7 and 8.8. The methods additionally include the step of heating the solution to cause urea decomposition, thereby precipitating a compound from the solution. In some embodiments, heating the solution includes holding the solution at a temperature above 60° C.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

In various aspects, cathode-active materials, their precursors, and methods of forming the same are described. Urea is used to prepare a metal precursor, which in turn, is then processed into a cathode-active material. Urea is added into a solution whose pH is subsequently raised to a threshold pH. Heat is applied to the solution, which may include decomposing urea therein into carbon dioxide and ammonia. The threshold pH and urea decomposition function in combination to control a nucleation and growth of seeds into precipitate particles. Such control enables improvements in characteristics of the precipitate particles including density, particle size, particle size distribution, morphology, composition, and chemical homogeneity. Other characteristics and their improvements are possible.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
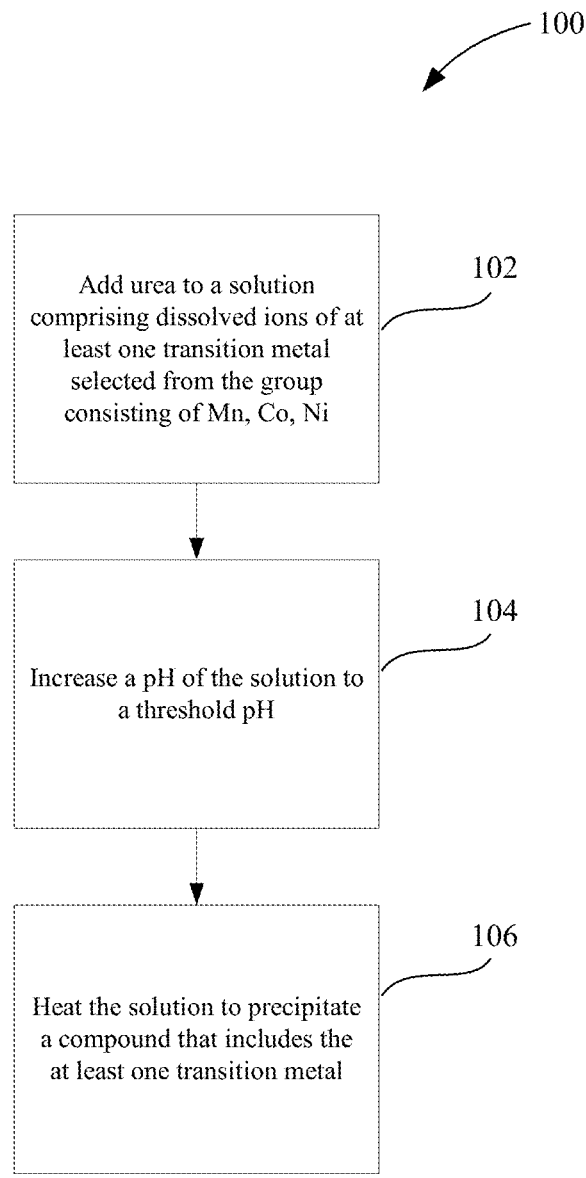
FIG. 1 is a flowchart of a method for synthesizing a metal precursor for a cathode-active material in accordance with embodiments of the disclosure.

Referring now to FIG. 1, a flowchart is presented of a method 100 for synthesizing a metal precursor for a cathode-active material in accordance with embodiments of the disclosure. The method 100 includes the step 102 of adding urea to a solution comprising dissolved ions of at least one transition metal. The transition metal can be Mn, Co, Ni, or a combination thereof. The urea may be in solid form, or alternatively, be pre-dissolved in a secondary solution. In some embodiments, the urea is pre-dissolved in the secondary solution at a concentration ranging from 0.01-10 M. In some embodiments, concentrations of the transition metal(s) in combination range from 0.01-5 M. It will be appreciated that the solution is not limited to urea and dissolved ion of the transition metal(s). The solution may contain additional ions or complexes as necessary to synthesize the metal precursor (e.g., ions for dopants, surfactants, etc.).

In some embodiments, the urea is dissolved in the solution. The amount of urea can be determined by those skilled in the art (e.g., via experimentation), and may incorporate considerations of the transition metal used, amount of desired precipitate, amount of transition metal in the solution, synthesis temperature, and/or synthesis pH. Other considerations are possible, including those involving the concentration and type of ions (in addition to the transition metal) dissolved in the solution. The amount of urea may correspond to a concentration ratio of urea to the transition metal(s).

The method 100 additionally includes the step 104 of increasing a pH of the solution to a threshold pH. The threshold pH may lie below a pH value where seeds nucleate in the solution during precipitation. For example, and without limitation, if seeds nucleate at pH values above 8.0, the threshold pH may be set at a pH value of 8.0. The threshold pH may also correspond to a pH value in which the seeds nucleated, but their growth into precipitate particles has not begun or is not complete. Such seeds may serve as point of origination for compound precipitation during subsequent processing steps. For example, and without limitation, if seeds nucleate and grow within a pH range spanning 8.0-8.7, the threshold pH may be set at a pH value of 8.2. In some embodiments, the threshold pH enables seeds less than 100 nm in diameter. In some embodiments, the threshold pH corresponds to a translucent solution.

In some embodiments, the pH of the solution can be increased using a basic additive. Any type of basic additive may be used. For example, and without limitation, the pH of the solution may be increased using lithium hydroxide, sodium hydroxide, potassium hydroxide, rubidium hydroxide, ammonium hydroxide, methylamine, hydroxylamine, and pyridine. Other types of basic additives are possible. In some embodiments, the basic additive is dissolved in water. In some embodiments, the basic additive can be dissolved in water at a concentration ranging from 0.01-10M. It will be appreciated that the basic additive may also serve as a reactant. The basic additive may therefore be consumed as the pH of the solution is increased. Thus, by limiting the basic additive via the threshold pH, a nucleation of seeds, a growth of seeds, or both, may be controlled.

Figure 2:
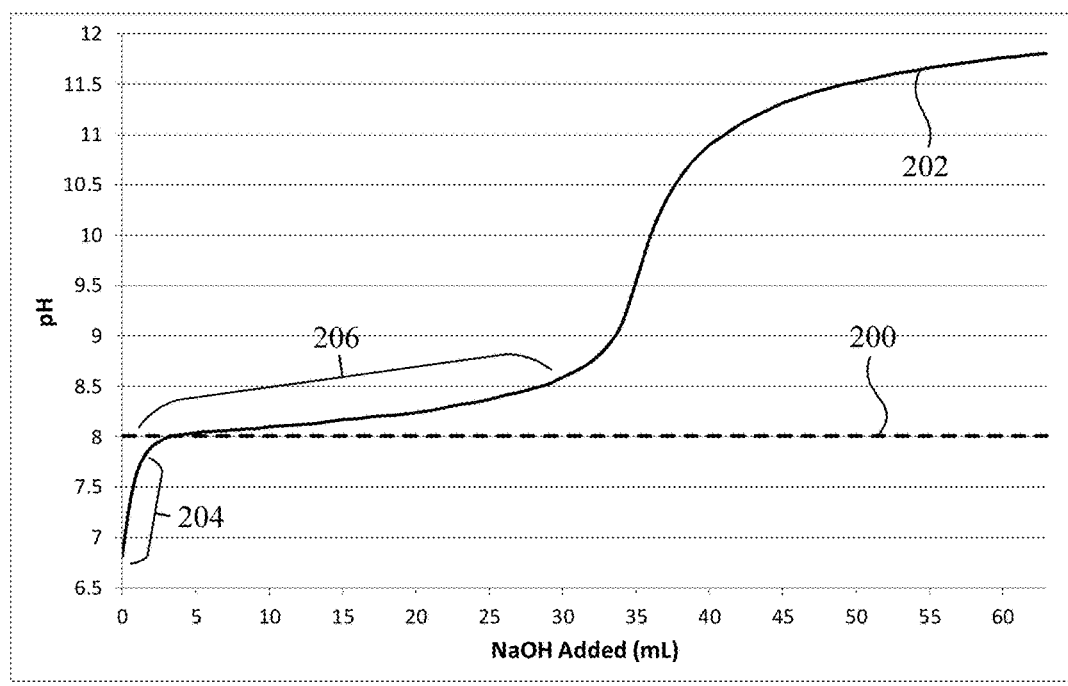
FIG. 2 is a schematic plot of data representing a variation in pH of a 0.025 M solution of cobalt(II) sulfate while being titrated by a 0.05 M solution of sodium hydroxide, in accordance with embodiments of the disclosure.

A non-limiting example of a threshold pH is shown in FIG. 2, which presents a variation in pH of an solution of cobalt(II) sulfate while being titrated by a solution of sodium hydroxide. The threshold pH is indicated by a dashed line 200 and the variation in pH is indicated by a solid curve 202. Introduction of the solution of sodium hydroxide into the solution of cobalt(II) sulfate causes an initial rise in pH, as indicated by bracket 204. In some embodiments, the initial rise in pH can be steep at first and then transition into a shallow and extended rise as the titration proceeds, as shown by bracket 206. The transition, occurring at a pH value of approximately 8.0, corresponds to an onset of nucleation that produces seeds in the solution of cobalt(II) sulfate. After the transition, these seeds grow into precipitate particles as sodium hydroxide is continuously supplied to the solution of cobalt(II) sulfate. Seed nucleation, however, may persist throughout the shallow and extended rise.

The transition corresponds to the onset of nucleation. As such, the threshold pH may be selected to exclude the transition, i.e., be set at a pH value below approximately 8.0. The threshold pH may also be selected to include the transition, i.e., be set at a pH value of 8.0. The dashed line 200 in FIG. 2 illustrates this alternate selection. The threshold pH may also be selected to include the transition and allow for limited growth of the seeds. Thus, the threshold pH may be set at pH values that occur within the shallow and extended rise (e.g., a pH value of 8.2) but before growth into precipitate particles is complete (i.e., a pH of approximately 8.7).

It will be understood that FIG. 2 is provided for purposes of illustration only and is not intended to limit a manner in which the threshold pH may be determined or set. Other variations in pH and their corresponding features may be used to determine or set the threshold pH. For example, in some embodiments, the threshold pH may be in the range of 7.0 to 9.0.

Now referring back to FIG. 1, the method 100 also includes the step 106 of heating the solution to precipitate a compound that includes the transition metal(s). The step 106 of heating the solution may include heating the solution to cause urea decomposition. Decomposition of urea can induce a precipitation reaction that forms the compound. During such decomposition, by-products of carbon dioxide and ammonia can be generated in accordance with the following equation:

$$CO(NH_2)_2 + H_2O \rightarrow CO_2 + NH_3 \qquad \text{(Equation 1)}$$

Further, these by-products may volatilize out of the solution or become solvated therein. For example, and without limitation, an ammonia by-product may solvate according to:

$$NH_3 + H_2O \leftrightarrow NH_4OH \leftrightarrow NH_4^+ + OH^- \quad \text{(Equation 2)}$$

It will be appreciated that urea decomposition can be regulated to control a nucleation and growth of seeds in the solution. Such control results in precipitate particles that can serve as the transition metal precursor. Thermal process parameters, such as temperatures and heating rates, can be used to control by-product generation in the solution of urea. Other thermal process parameters are possible. In some embodiments, urea decomposition occurs within a temperature range spanning 75-150° C., while in other embodiments the temperature range may be 80-140° C.

Figure 3:
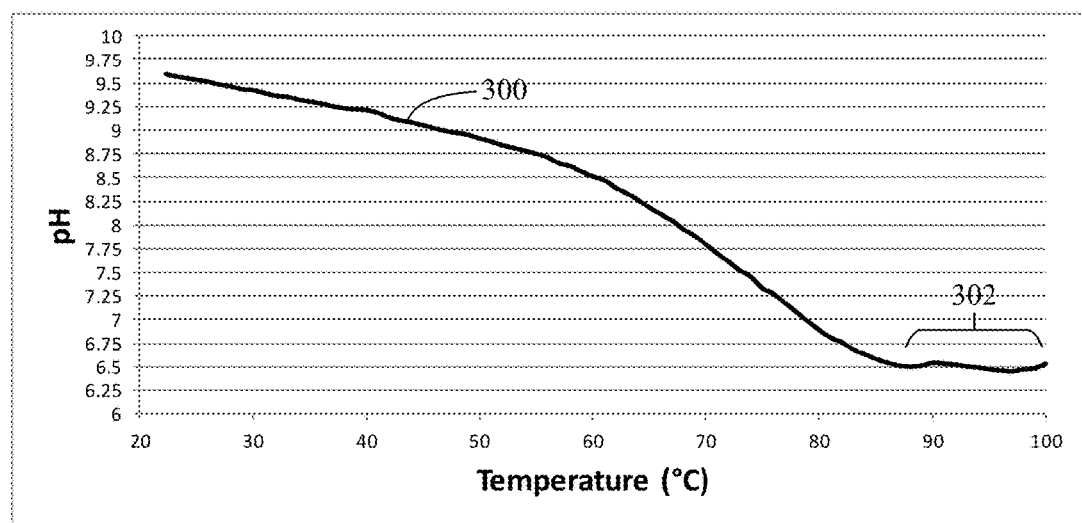
FIG. 3 is a schematic plot of data representing a variation in pH of a 1.0 M solution of urea during heating from room temperature to 100° C., in accordance with embodiments of the disclosure.

FIG. 3 presents a schematic plot of data representing a variation in pH of an solution of urea while being heated. The variation in pH is indicated by a solid curve 300. The solution of urea contains no additional components (i.e., no dissolved ions, no basic additives, etc.). As heating proceeds, the pH decreases gradually until reaching a plateau. This gradual decrease is distributed over a broad temperature range (i.e., 22-87° C.). The plateau, indicated by bracket 302, is positioned at a pH value of approximately 6.5 and corresponds to a state in which virtually all urea has decomposed (i.e., greater than 95% of the urea has decomposed). In some embodiments, at least 99.0% of the urea may have decomposed, while in other embodiments at least 99.9% of the urea may have decomposed. The broad temperature range highlights a slow, controllable decomposition process for urea. Thus, control over thermal process parameters (e.g., temperatures, heating rates, etc.) allows concomitant control over by-product generation, and in particular, control of the ammonia by-product.

Dissolved ions of the transition metal(s) may hydrate into a solvated complex. Such hydration may involve water ligands coordinating to the transition metal(s) (i.e., ligand coordination). For example, and without intending to be limiting, a solvated cobalt(II) complex may form according to:

$$CoSO_4 + 6H_2O \rightarrow [Co(OH_2)_6]SO_4 \quad \text{(Equation 3)}$$

Moreover, relative to water ligands, dissolved ions of transition metals can be preferentially coordinated by ammonia ligands. For example, and without being limited by theory, the solvated cobalt(II) complex of Equation 3, i.e., [Co(OH$_2$)$_6$]SO$_4$, can change coordination according to:

$$[Co(OH_2)_6]SO_4 + 6NH_3 \rightarrow [Co(NH_3)_6]SO_4 + 6H_2O \quad \text{(Equation 4)}$$

Furthermore, the dissolved ions of transition metals, when coordinated by ammonia, are susceptible to reaction with ammonium ions. Such reaction enables seed nucleation and growth. For example, and without limitation, the ammoniated cobalt(II) complex of Equation 4, i.e., [Co(NH$_3$)$_6$]SO$_4$, may undergo reaction according to:

$$[Co(NH_3)_6]SO_4 + 2NH_4^+ + 2OH^- \leftrightarrow Co(OH)_2 + (NH_4)_2SO_4 + 6NH_3 \quad \text{(Equation 5)}$$

It will be appreciated that cobalt(II) hydroxide complexes are insoluble in water. Thus, manipulation of the reactions represented by Equations 4 and 5 allow control over nucleation and growth of cobalt(II)-containing precipitate particles from seeds. Such manipulation is enabled by controlling a content of ammonia in the solution.

In general, urea decomposition provides a mechanism to control a release rate of ammonia into the solution as well as a total amount of ammonia therein. Such control influences seed nucleation and growth that, in turn, produces precipitate particles within the solution. Such precipitate particles, or precipitates, form the metal precursor.

Urea decomposition can be selectively controlled, i.e., via the thermal process parameters, to influence precipitate characteristics such as density, particle size, particle size distribution, morphology, composition, and chemical homogeneity. Other precipitate characteristics are possible. Possible thermal process parameters include holding temperatures, holding times at holding temperatures, and heating rates (e.g., change in temperature per unit time). Other thermal process parameters are possible, including sequences of thermal process parameters that define a thermal process schedule.

It is an advantage of the method 100 that urea decomposition can operate in combination with the basic additive, when present, to reduce or eliminate an incorporation of carbonate species (i.e., CO$_3$) in the metal precursor. This advantage may not present in synthetic methods relying on urea alone. Carbonate species can be produced when carbon dioxide solvates according to:

$$CO_2 + H_2O \leftrightarrow H_2CO_3 \leftrightarrow H^+ + HCO_3^- \leftrightarrow 2H^+ + CO_3^{2-} \quad \text{(Equation 6)}$$

This solvation process produces a concentration of carbonate ions (i.e., CO$_3^{2-}$) dissolved in the solution. Carbonate ions may compete with other ligands (e.g., ammonia, ammonium, aquo, hydroxide, etc.) to coordinate dissolved ions of the transition metal(s), thereby altering a final composition of the transition metal precursor, e.g., Co(CO$_3$)$_x$(OH)$_{2(1-x)}$ instead of Co(OH)$_2$. Urea decomposition contributes to this process by serving as a source of carbon dioxide.

The basic additive, however, mitigates an impact of carbonic acid (i.e., H$_2$CO$_3$) and its by-products of disassociation (i.e., H$^+$, HCO$_3^-$, and CO$_3^{2-}$). The basic additive may neutralize acidic protons of the carbonic acid (i.e., H$^+$). The basic additive may also provide alternate ions to the solution that chemically interact with the carbonate ions. For example, and without limitation, if the basic additive includes sodium hydroxide, sodium ions therefrom (i.e., Na$^+$) may provide alternate ions to interact with the carbonate ions. Such interaction may reduce availability of carbonate ions to react with the transition metal(s). Other benefits are possible.

Moreover, the basic additive may allow for seeds in the solution that serve as points of origination for growth induced by urea decomposition. These seeds, when processed according to the thermal process schedule, may produce precipitate particles having improved characteristics (e.g., an improved density, better defined morphology, etc.). Such improved characteristics may be difficult to replicate if seeds are not nucleated before the decomposition of the urea is initiated. In certain instances, the precipitate particles may exhibit unique properties such as compositional gradients.

Figure 4:
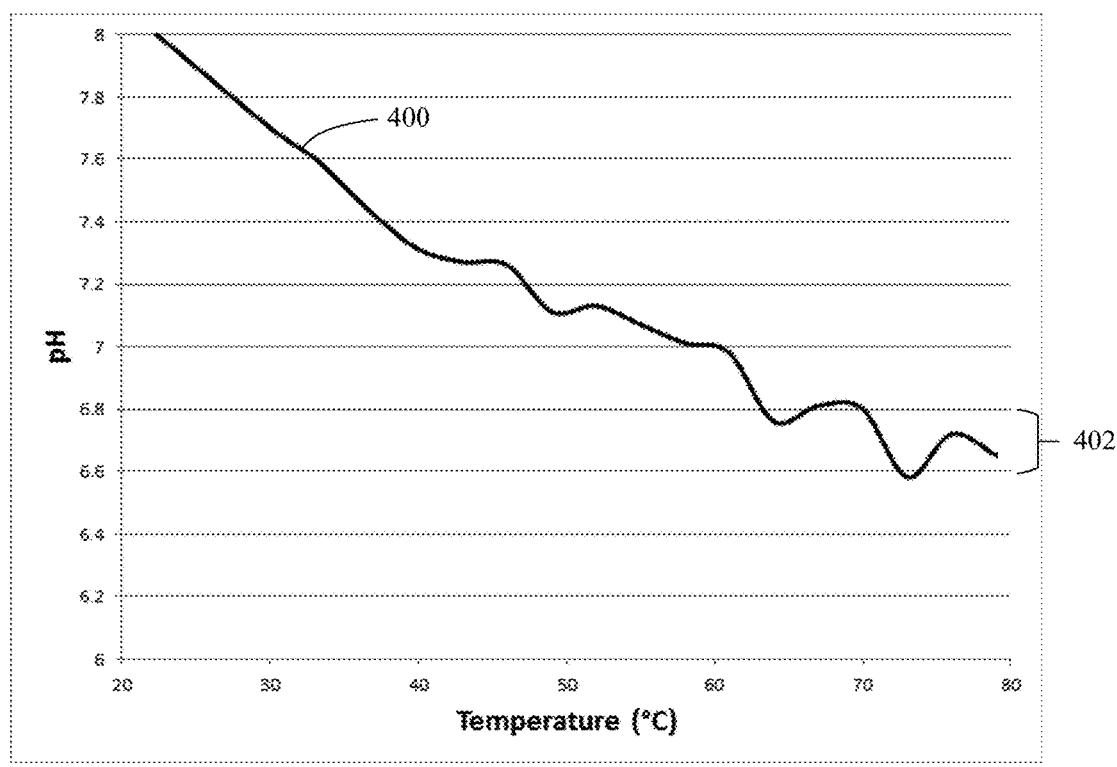
FIG. 4 is a schematic plot of data representing a variation in pH of a solution of cobalt(II) sulfate, manganese(II) sulfate, sodium hydroxide, and urea during heating from room temperature to 80° C., in accordance with embodiments of the disclosure.

In some embodiments, the transition metals are a combination of Mn and Co. FIG. 4 presents a schematic plot of data representing a variation in pH of an solution of manganese(II) sulfate, cobalt(II) sulfate, sodium hydroxide, and urea while being heated. The variation in pH is indicated by a solid curve 400. Before heating, urea was added to the solution to establish an 8:1 concentration ratio of urea to transition metal sulfate (i.e., manganese(II) sulfate and cobalt(II) sulfate in combination). Also before heating, sodium hydroxide was introduced into the solution as a basic additive to achieve the threshold pH (e.g., 8.0). The variation in pH, as indicated by the solid curve 400, declines gradually with temperature until reaching approximately 80° C., where a pH range of 6.6-6.8 emerges. This pH range is maintained while held at 80° C. (not shown). However, after 30 minutes, precipitates begin to form as urea decomposes (i.e., as seed nucleation and growth is induced). After 110 minutes, the urea decomposition is complete and the solution allowed to cool to room temperature.

Figure 5:
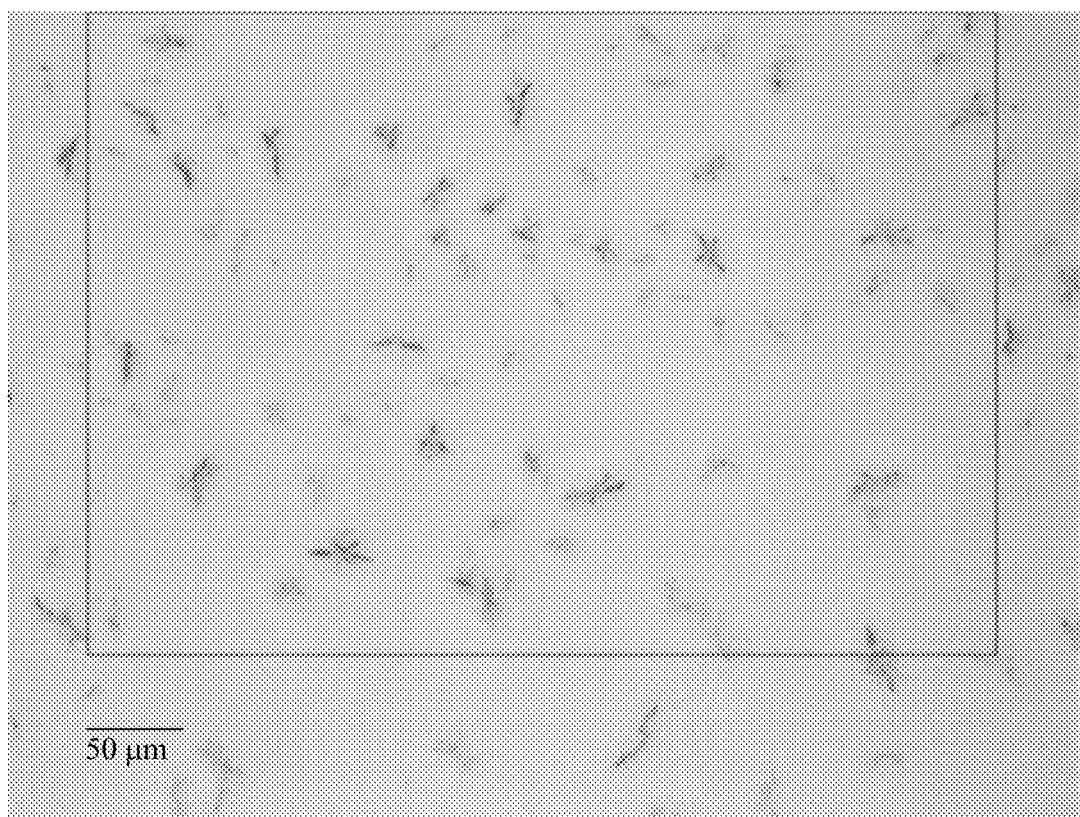
FIG. 5 is an optical micrograph of a cobalt-manganese precursor, produced in accordance with embodiments of the disclosure, referenced against a 50 micrometer scale bar.
Figure 6:
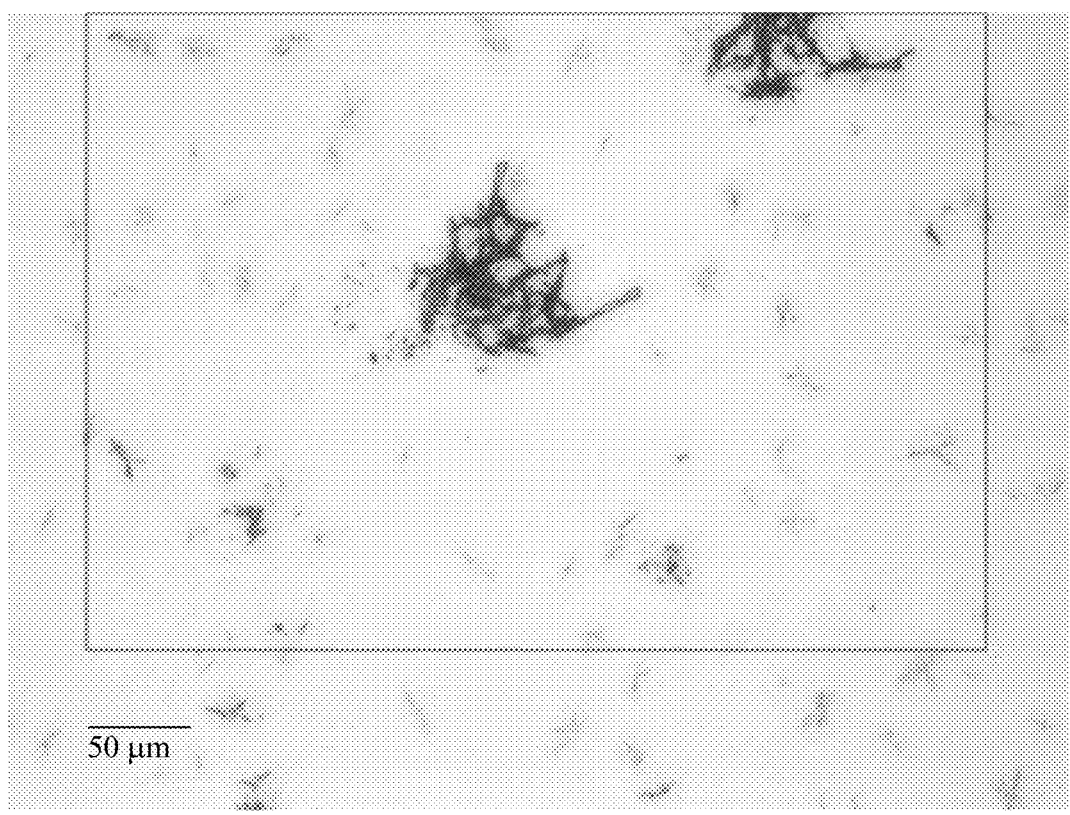
FIG. 6 is an optical micrograph of the cobalt-manganese precursor of FIG. 5 showing agglomerates of acicular-shaped particles.

FIG. 5 presents an optical micrograph of the precipitates, i.e., a cobalt-manganese precursor, referenced against a 50 micrometer scale bar. FIG. 6 presents an optical micrograph of the cobalt-manganese precursor of FIG. 5 showing larger agglomerates of acicular-shaped particles. The cobalt-manganese precursor is referenced against a 50 micrometer scale bar.

In some embodiments, the method 100 includes the step 102 of preparing the solution using at least one transition metal salt. The transition metal salt can be a manganese salt, a cobalt salt, a nickel salt, or a combination thereof. Such preparation may include dissolving the the transition metal salt(s) into the solution. Non-limiting examples of transition metal salts include chlorides, nitrates, sulfates, carbonates, cyanates, thiocyanates, and acetates of manganese, cobalt, or nickel. Other transition metal salts are possible.

Figure 7:
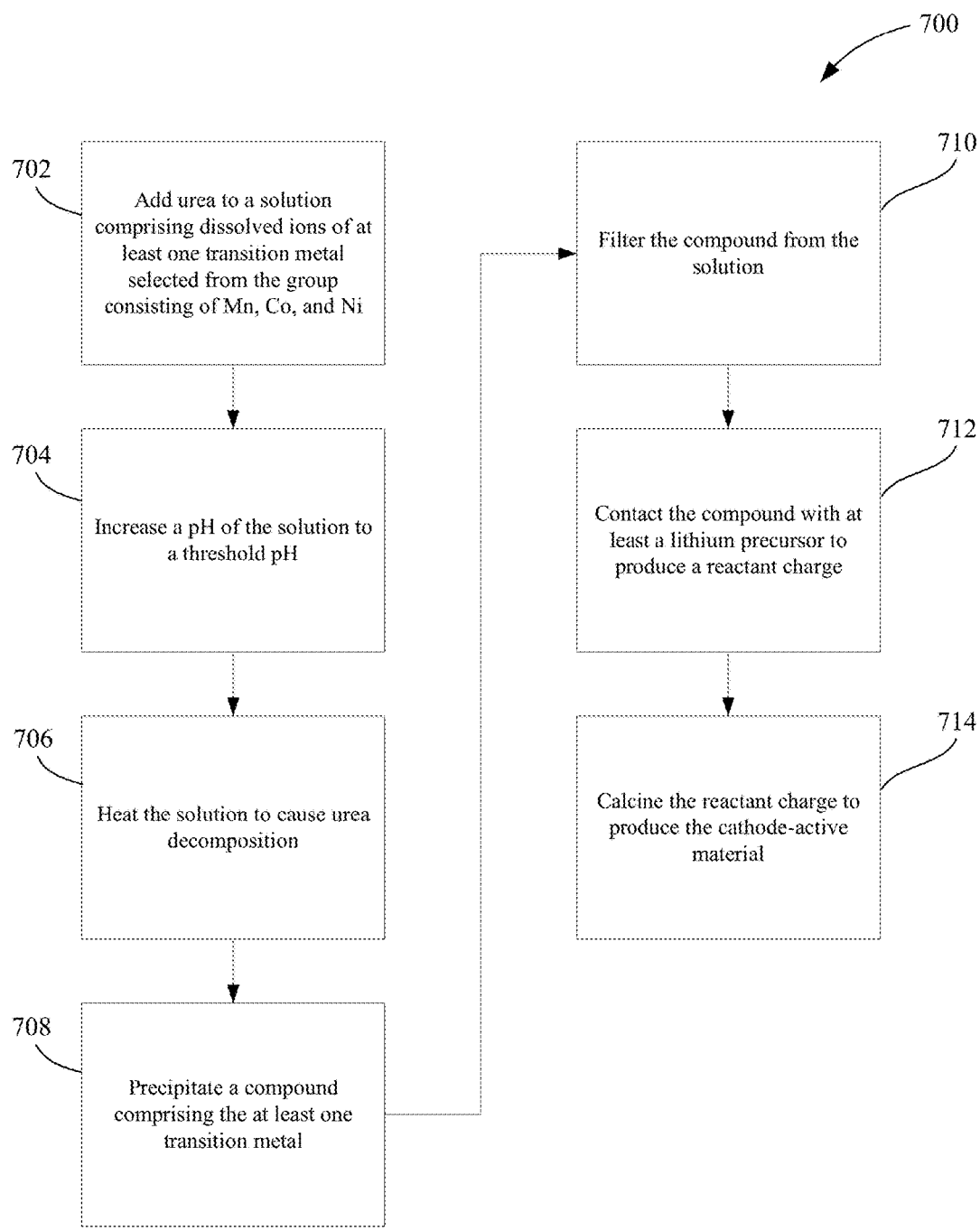
FIG. 7 is flowchart of a method for producing a cathode active material using a metal precursor, in accordance with embodiments of the disclosure.

Now referring to FIG. 7, a flowchart is presented of a method 700 for producing a cathode-active material using a transition metal precursor. The method 700 includes the step 702 of adding urea to a solution comprising at least one transition metal selected from Mn, Co, and Ni. The method 700 also includes the step 704 of increasing a pH of the solution to a threshold pH. The method 700 additionally includes the step 706 of heating the solution to cause urea decomposition. Moreover, the method 700 includes the step 708 of precipitating a compound that includes the transition metal. The method 700 may include the optional step of preparing the solution comprising the transition metal salt. It will be appreciated that steps 702-708, including the optional step of preparing the solution, are analogous to steps previously described in relation to FIGS. 1-6.

The method 700 involves the step 710 of filtering the compound from the solution. In some embodiments, the step 710 of filtering the compound includes washing the compound. Such washing may include deionized water. In some embodiments, the step 710 of filtering the compound includes washing the compound and drying the compound. In further embodiments, drying the precipitated compound may include heating the precipitates. Such heating may involve an elevated temperature (e.g., between 20-100° C.). Moreover, an inert drying environment may be used during heating, such as an atmosphere of nitrogen or argon gas. In some embodiments, the compound is heated to convert the metal precursor into a metal oxide material. The metal oxide material includes the transition metal(s) and may be used in subsequent steps of the method 700.

The method 700 also involves the step 712 of contacting the filtered compound with at least a lithium precursor to produce a reactant charge. Such contacting may involve blending, mixing, stirring, grinding, beating, ball-milling, cryo-milling, pressing, and shearing. Other forms of contacting are possible. Non-limiting examples of the lithium precursor include lithium hydroxide, lithium carbonate, lithium acetate, lithium nitrate, and lithium chloride. Other lithium precursors are possible. The method 700 additionally involves the step 714 of calcining the reactant charge to produce the cathode-active material. Such calcination may include temperatures above 600° C.

In some embodiments, the cathode-active material has a composition represented by $LiMe_2O_4$ and wherein Me comprises Mn, Co, Ni, or any combination thereof. In other embodiments, the cathode-active material has a composition represented by $Li_{1+x}Ni_\alpha Mn_\beta Co_\gamma M_\delta O_2$. In such embodiments, M is Mg, Zn, Al, Ga, B, Zr, Ti, or any combination thereof; $0 \leq x \leq 0.4$; $0 \leq \alpha \leq 1$; $0 \leq \beta \leq 1$; $0 \leq \gamma \leq 1$; and $0 \leq \delta \leq 0.1$.

In embodiments where the cathode-active material has a composition represented by $Li_{1+x}Ni_\alpha Mn_\beta Co_\gamma M_\delta O_2$, the solution may further include dissolved ions of Mg, Zn, Al, Ga, $BO_3$, or any combination thereof. Moreover, the compound may further be contacted with a boron precursor, titanium precursor, a zirconium precursor, or any combination thereof, to produce the reactant charge. Such contacting may involve blending, mixing, stirring, grinding, beating, ball-milling, cryo-milling, pressing, and shearing. Other forms of contacting are possible.

According to an illustrative embodiment, a method involves synthesizing a metal precursor for a cathode-active material comprising Mn and Co. The method includes the step of adding urea to a solution comprising dissolved ions of Mn and Co. The method also includes the step of increasing a pH of the solution to a threshold pH between 7.7 and 8.8. The method additionally includes the step of heating the solution to cause urea decomposition, thereby precipitating a compound from the solution. In some embodiments, step of heating the solution includes holding the solution at a temperature above 60° C.

In some embodiments, the method includes the step of preparing the solution using a manganese salt and a cobalt salt. In such embodiments, the manganese salt and the cobalt salt are selected from the chlorides, nitrates, sulfates, carbonates, oxalate, cyanates, thiocyanates, and acetates. In some embodiments, the method includes filtering the compound from the solution and contacting the compound with at least a lithium precursor to produce a reactant charge. In these embodiments, the method also includes calcining the reactant charge to produce the cathode-active material.

EXAMPLES

The following examples illustrate various aspects of the disclosure. It will be apparent to those skilled in the art that many modifications, both to materials and methods, may be practiced without departing from the scope of the disclosure.

Example 1

A 0.025 M solution of cobalt(II) sulfate was prepared by dissolving cobalt(II) sulfate heptahydrate (i.e., $CoSO_4.7H_2O$) in deionized water. A volume of 40 mL was prepared. Measurements of the pH indicated an as-prepared value of 6.81. In a separate container, sodium hydroxide (NaOH) was dissolved in deionized water to obtain a 0.05 M solution of sodium hydroxide. Measurements of the pH indicated an as-prepared value of 12.43 for this secondary solution. The 0.05 M solution of sodium hydroxide was then titrated into the 0.025 M solution of cobalt(II) sulfate at a rate of 0.05 mL every two seconds. FIG. 2 presents a variation in pH of the 0.025 M solution of cobalt(II) sulfate solution with increasing amounts of 0.05 M solution of sodium hydroxide. The 0.025 M solution of cobalt(II) sulfate began precipitating at a pH value of approximately 8.0. Such precipitation continued until the pH value reached approximately 8.7. After the precipitation ceased, continued titration of the 0.025 M solution of cobalt(II) sulfate with the 0.05 M solution of sodium hydroxide resulted in a rapid rise in pH. The rapid rise in pH was followed by an asymptotic approach toward the as-prepared pH value of the 0.05 M solution of sodium hydroxide.

Example 2

A 1.0 M solution of urea was prepared by dissolving urea into deionized water. A volume of 150 mL was prepared. The 1.0 M solution of urea was slowly heated from room temperature to 100° C. FIG. 3 presents a corresponding variation in pH during heating.

Example 3

A 1.0 M solution of transition metal sulfate was prepared by dissolving cobalt(II) sulfate heptahydrate (i.e., $CoSO_4.7H_2O$) and manganese(II) sulfate monohydrate (i.e., $MnSO_4,H_2O$) into deionized water. The two sulfate compounds were apportioned so as to produce a 1.0 M solution of transition metal sulfate having 96% cobalt(II) sulfate and 4% manganese(II) sulfate therein. In a separate container, an 8.0 M solution of urea was prepared by dissolving urea into deionized water. The 8.0 M solution of urea was added to the 1.0 M solution of transition metal sulfate to produce 225 mL of combined solution yet maintain an 8:1 concentration ratio, i.e., between urea and the transition metal sulfate. A sodium hydroxide solution was titrated into the 1.0 M solution of transition metal sulfate in order to increase the pH to 8.0. The 1.0 M solution of transition metal sulfate was then heated from room temperature to 80° C. FIG. 4 presents a variation in pH of the 1.0 M solution of transition metal sulfate during this heating process. After being held isothermally at 80° C., precipitates began to appear after 30 minutes. The precipitation continued for approximately 110 minutes, after which the 1.0 M solution of transition metal sulfate was allowed to cool. FIGS. 4 & 5 present optical micrographs of the precipitates referenced against a 50 micrometer scale bar.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for synthesizing a metal precursor for a cathode-active material, comprising:
    adding urea to a solution comprising dissolved ions of at least one transition metal selected from Mn, Co, and Ni;
    increasing a pH of the solution up to a pH at which seeds of a precipitate nucleate within the solution in which 99% of the urea is decomposed; and
    at the pH, heating the solution to precipitate particles comprising the at least one transition metal.

2. The method of claim 1, further comprising:
    preparing the solution comprising at least one transition metal salt.

3. The method of claim 1, wherein the solution is aqueous.

4. The method of claim 1, wherein the pH is increased using a basic additive.

5. The method of claim 1, wherein heating the solution comprises heating the solution to cause urea decomposition.

6. The method of claim 1, wherein the at least one transition metal is a combination of Mn and Co.

7. A method for producing a cathode-active material comprising:
    adding urea to a solution comprising dissolved ions of at least one transition metal selected from the Mn, Co, and Ni;
    increasing a pH of the solution up to a pH at which seeds of a precipitate nucleate within the solution in which at least 99% of the urea is decomposed;
    at the pH, heating the solution to cause urea decomposition;
    precipitating particles comprising the at least one transition metal;
    filtering the precipitated particles from the solution;
    contacting the filtered particles with at least a lithium precursor to produce a reactant charge; and
    calcining the reactant charge to produce the cathode-active material.

8. The method of claim 7, further comprising:
    preparing the solution using at least one transition metal salt.

9. The method of claim 7, wherein filtering the precipitated particles comprises washing the precipitated particles.

10. The method of claim 9, wherein the precipitated particles is are washed with at least deionized water.

11. The method of claim 7, wherein filtering the precipitated particles comprises washing the precipitated particles and drying the precipitated particles.

12. The method of claim 11, wherein the drying the precipitated particles comprises heating the precipitated particles.

13. The method of claim 7, wherein the cathode-active material has a composition represented by $LiMe_2O_4$ and wherein Me comprises Mn, Co, Ni, or any combination thereof.

14. The method of claim 7,
    wherein the cathode-active material has a composition represented by $Li_{1+x}Ni_\alpha Mn_\beta Co_\gamma M_\delta O_2$;
    wherein M is Mg, Zn, Al, Ga, B, Zr, Ti, or any combination thereof;
    wherein $0 \leq x \leq 0.4$;
    wherein $0 \leq \alpha \leq 1$;
    wherein $0 \leq \beta \leq 1$;
    wherein $0 \leq \gamma \leq 1$; and
    wherein $0 \leq \delta \leq 0.1$.

15. The method of claim 14, wherein the solution further comprises dissolved ions of Mg, Zn, Al, Ga, $BO_3$, or any combination thereof.

16. The method of claim 14, wherein the filtered particles are further contacted with a boron precursor, titanium precursor, a zirconium precursor, or any combination thereof, to produce the reactant charge.

17. A method for synthesizing a metal precursor for a cathode active material comprising:
    adding urea to a solution comprising dissolved ions of Mn and Co;
    increasing a pH of the solution up to a pH between 7.7 and 8.8;
    heating the solution to a temperature below a boiling temperature of the solution to cause urea decomposition, thereby precipitating particles in the solution.

18. The method of claim 17, further comprising:
    preparing the solution using a manganese salt and a cobalt salt;

wherein the manganese salt and the cobalt salt are each selected from the group of salts consisting of chlorides, nitrates, sulfates, carbonates, oxalates, cyanates, thiocyanates, and acetates.

19. The method of claim 17, wherein heating the solution comprises holding the solution at a temperature above 60° C.

20. The method of claim 17, further comprising:
   filtering the particles from the solution;
   contacting the filtered particles with at least a lithium precursor to produce a reactant charge; and
   calcining the reactant charge to produce the cathode-active material.

\* \* \* \* \*